(12) United States Patent
Niki et al.

(10) Patent No.: US 7,204,443 B2
(45) Date of Patent: Apr. 17, 2007

(54) ROLL OF POLYVINYL ALCOHOL FILM AND POLARIZING FILM PREPARED THEREFROM

(75) Inventors: Hidefumi Niki, Ogaki (JP); Toshiyuki Edazawa, Ogaki (JP)

(73) Assignee: The Nippon Synthetic Chemical Industry Co., Ltd., Osaka-fu (JP)

( * ) Notice: Subject to any disclaimer, the term of this patent is extended or adjusted under 35 U.S.C. 154(b) by 101 days.

(21) Appl. No.: 10/731,289

(22) Filed: Dec. 9, 2003

(65) Prior Publication Data

US 2004/0114240 A1   Jun. 17, 2004

(51) Int. Cl.
   *B65H 18/28*   (2006.01)
(52) U.S. Cl. .................. 242/160.4; 242/160.1
(58) Field of Classification Search ........ None
   See application file for complete search history.

(56) References Cited

U.S. PATENT DOCUMENTS

| | | | | |
|---|---|---|---|---|
| 5,762,289 A | * | 6/1998 | Suzuki | 242/610.5 |
| 2001/0024322 A1 | | 9/2001 | Harita et al. | 359/490 |
| 2001/0039319 A1 | * | 11/2001 | Harita et al. | 526/319 |
| 2002/0001700 A1 | * | 1/2002 | Sanefuji et al. | 428/220 |
| 2003/0156235 A1 | * | 8/2003 | Kazuhara et al. | 349/96 |
| 2004/0069885 A1 | * | 4/2004 | Kobayashi et al. | 242/160.4 |

FOREIGN PATENT DOCUMENTS

| | | |
|---|---|---|
| EP | 1 162 227 A1 * | 12/2001 |
| JP | 2001310435 A * | 11/2001 |

OTHER PUBLICATIONS

Edward Boyle, "Core selection—the difference between success and failure", Paper, Film & Foil Converter, Feb. 1, 1996.*

* cited by examiner

*Primary Examiner*—Arnel Lavarias
(74) *Attorney, Agent, or Firm*—Ware, Fressola, Van Der Sluys & Adolphson LLP

(57) ABSTRACT

A polyvinyl alcohol film roll including a cylindrical core tube made of a metallic material and having a surface roughness of at most 100 S and a polyvinyl alcohol film wound up around the cylindrical core tube, the film roll being obtained by forming the film from a solution of a polyvinyl alcohol resin and winding up the film around the core tube, and the film roll being capable of providing an optically homogeneous polyvinyl alcohol film having an excellent appearance.

2 Claims, No Drawings

ROLL OF POLYVINYL ALCOHOL FILM AND POLARIZING FILM PREPARED THEREFROM

BACKGROUND OF THE INVENTION

The present invention relates to a roll of a polyvinyl alcohol film wherein a very long polyvinyl alcohol film can be rolled up and the rolled up film has an excellent appearance, and a polarizing film having an excellent polarizing property prepared from the film roll.

Polyvinyl alcohol films have been generally prepared by dissolving a polyvinyl alcohol resin in a solvent, deaerating the resulting solution, forming it into a film by a solution casting method and drying the film by using a metallic heating roll and the like. The film which has passed through the above drying step is then dried by a drier to evaporate the moisture contained in the film, provided again with a predetermined amount of moisture in a humidity conditioner and rolled up around a cylindrical core tube to give a rolled up film to be put on the market. The thus rolled up polyvinyl alcohol films have been utilized for many applications as a film having an excellent shape stability. One of the useful applications is an optical film, particularly a polarizing film.

However, when rolling up a polyvinyl alcohol film around a cylindrical core, problems may arise in appearance of the film, e.g., generation of wrinkles and folds. Therefore, careful process step management is required. If such problems arise, another problem of course arises. For example, if a polarizing film is produced from a film that has once caused such a problem, the polarizing property is deteriorated.

It is an object of the present invention to provide a roll of a polyvinyl alcohol film having an excellent appearance and accordingly having an optical homogeneity with industrial advantage and without requiring severe process management as conventionally required.

A further object of the present invention is to provide a roll of a long polyvinyl alcohol film from which a polyvinyl alcohol film having an excellent appearance and an optical homogeneity is obtained when unwound.

Another object of the present invention is to provide a polarizing film having an excellent polarizing property.

These and other objects of the present invention will become apparent from the description hereinafter.

SUMMARY OF THE INVENTION

In order to prevent a polyvinyl alcohol film from forming wrinkles and the like in the step of winding up the film around a cylindrical core to thereby obtain a polyvinyl alcohol film having an excellent appearance, investigation was made with respect to the winding up step, a cylindrical core used therein and so on. Thus, it has been found that if a cylindrical core tube for winding up the film is made from a metallic material and the surface roughness thereof is set to at most 100 S, a phenomenon such as bending of the cylindrical core tube which may occur during the winding can be suppressed and the film can be properly wound up around the cylindrical core tube without generating wrinkles and so on, so a roll of a polyvinyl alcohol film having an excellent appearance is obtained.

In accordance with the present invention, there is provided a roll of a polyvinyl alcohol film obtained by winding up the polyvinyl alcohol film around a cylindrical core tube after forming the film from a solution of a polyvinyl alcohol resin, wherein the cylindrical core tube is made of a metallic material and has a surface roughness of at most 100 S.

The present invention also provide a polarizing film prepared from a polyvinyl alcohol film unwound from the above-mentioned film roll of the present invention.

DETAILED DESCRIPTION

In the present invention, polyvinyl alcohol resins are used as a material for forming a film, and a film roll is prepared from a solution of a polyvinyl alcohol resin.

The polyvinyl alcohol resins are usually prepared by polymerizing vinyl acetate and hydrolyzing the polyvinyl acetate. The polyvinyl alcohol resins used in the present invention are not limited to hydrolysis products of polyvinyl acetate, and may contain a small amount, e.g., 0 to 15% by mole, especially 0 to 5% by mole, of other components copolymerizable with vinyl acetate, e.g., an unsaturated carboxylic acid (including its salt, ester, amide and nitrile), an olefin having 2 to 30 carbon atoms such as ethylene, propylene, n-butene or isobutene, a vinyl ether, an unsaturated sulfonic acid salt, and the like. The polyvinyl alcohol resins may be those containing a silyl group. The silyl group-containing resins can be prepared, for example, by post modification using a silylating agent, or copolymerization of vinyl acetate with an olefinically unsaturated monomer containing a silyl group followed by hydrolysis, according to a known method. Examples of the silyl group-containing olefinically unsaturated monomer are, for instance, vinylsilane, (meth)acrylamide alkylsilane, and the like.

The degree of polymerization of the polyvinyl alcohol resins is not particularly limited, but it is preferably from 1,000 to 7,000, more preferably 1,200 to 6,000, further more preferably 1,400 to 5,000. If the degree of polymerization is less than 1,000, sufficient polarizing property is not obtained when films of the polyvinyl alcohol resins are used for the production of polarizing films. If the degree of polymerization is more than 7,000, industrial production of polarizing films tends to become difficult since stretching of the films is difficult.

The degree of hydrolysis of the polyvinyl alcohol resins is preferably not less than 80% by mole, more preferably from 85 to 100% by mole, further more preferably from 98 to 100% by mole. If the degree of hydrolysis is less than 80% by mole, sufficient polarizing property is hard to be obtained when films of the polyvinyl alcohol resins are used for the production of polarizing films.

The polyvinyl alcohol resins may be incorporated, as occasion demands, with a conventionally used plasticizer such as glycerol, diglycerol, triglycerol, ethylene glycol, triethylene glycol or polyethylene glycol in an amount of at most 30% by weight, preferably at most 25% by weight, more preferably at most 20% by weight, based on the polyvinyl alcohol resin. If the amount of the plasticizer is more than 30% by weight, the film strength tends to deteriorate.

Preferably, the polyvinyl alcohol resins are incorporated with non-ionic, anionic or cationic surface active agents, especially surface active agents having a releasing action such as polyoxyethylene alkylamine, in an amount of at most 5% by weight, preferably from 0.001 to 3% by weight, more preferably from 0.001 to 2% by weight, based on the polyvinyl alcohol resin. If the amount of the surface active agent is more than 5% by weight, the appearance of the surface of films tends to deteriorate.

In the present invention, polyvinyl alcohol resin films are prepared using the polyvinyl alcohol resins as mentioned above.

A process for preparing a roll of a polyvinyl alcohol film is explained below

A polyvinyl alcohol resin is dissolved in a solvent, and the resulting polyvinyl alcohol resin solution is formed into a film to give a raw film web.

Examples of the solvent used for the preparation of polyvinyl alcohol resin solution are, for instance, water, organic solvents, e.g., dimethyl sulfoxide (DMSO), N-methylpyrrolidone, a polyhydric alcohol such as glycerol, ethylene glycol, propylene glycol, diethylene glycol, triethylene glycol, tetraethylene glycol or trimethylolpropane, an amine compound such as ethylenediamine or diethylenetriamine, and mixtures thereof.

The organic solvents as mentioned above may contain a small amount, e.g., 5 to 30% by weight, of water.

The concentration of the polyvinyl alcohol resin in the polyvinyl alcohol resin solution is preferably from 5 to 70% by weight from a practical point of view.

The film formation from the polyvinyl alcohol resin solution can be carried out by known methods such as casting and extrusion. The film forming method may be a wet method wherein the solution is discharged through a slit once into air or an inert gas atmosphere such as nitrogen, helium or argon and then led into a coagulating bath to form a non-stretched film, or a dry method wherein the solution is discharged through a slit onto a support such as a roller or a belt conveyer to form a film and is dried to give a non-stretched film.

The thus formed non-stretched film may be further subjected to drying treatment, heat treatment and humidity conditioning treatment, as occasion demands.

The polyvinyl alcohol film is subsequently rolled up around a cylindrical core tube to give a film roll which is provided to a market. The rolling up of the polyvinyl alcohol film around a cylindrical core tube is carried out by temporarily fastening the top of the film onto the surface of the core tube with a tape and rotating the core tube at a predetermined rolling up speed.

In the present invention, the cylindrical core tube for rolling up the film is made of metal materials. In particular, aluminum is preferred from the viewpoints of strength, weight saving, easiness in processing such as forming into desired shapes and prevention of incorporation of a foreign matter into the film.

The cylindrical core tube is required to have a surface roughness of at most 100 S, preferably at most 20 S, more preferably at most 10 S. If the surface roughness is more than 100 S, weaving occurs in winding the film. In the present invention, the surface roughness denotes the arithmetic average value (Ra: center line average height of surface roughness) as defined in JIS B 0601-1994.

It is preferable that the cylindrical core tube has a roundness of 0.01 to 1 mm and a cylindricality of 0.01 to 1 mm, preferably a roundness of 0.01 to 0.2 mm and a cylindricality of 0.01 to 0.2 mm, more preferably a roundness of 0.01 to 0.1 mm and a cylindricality of 0.01 to 0.1 mm. If the roundness is more than 1 mm, the section of the core tube approaches an ellipse and the core tube fluctuates at the time of winding a film, so wrinkles tend to generate. Also, if the cylindricality is more than 1 mm, the core tube fluctuates at the time of winding, so wrinkles and weaving tend to generate.

In the present invention, the roundness is a value measured according to JIS H 0500 and denotes a difference between the maximum outer diameter and the minimum outer diameter measured at a random section of a cylindrical core tube. The cylindricality is a value measured according to JIS B 0182 and denotes a difference between the maximum diameter and the minimum diameter of a cylindrical core tube.

The sizes of the cylindrical core tube vary depending on the sizes, such as the width and the like, of the polyvinyl alcohol film to be formed and wound. It is preferable to use a cylindrical core tube having an outer diameter of 75 to 210 mm and a cylinder length of 0.5 to 4.0 m, more preferably an outer diameter of 85 to 170 mm and a cylinder length of 0.5 to 3.5 m. If the outer diameter is less than 75 mm, the core tube bends and the film is easy to form wrinkles. If the outer diameter is more than 210 mm, the obtained film roll is difficult to handle since the diameter of the film roll becomes too large. Further, if the length of the core tube is less than 0.5 m, the width of a polarizing film to be prepared from the film roll is very small, so the productivity in the steps for preparing the polarizing film tends to lower. If the length is more than 4.0 m, the workability tends to lower since the weight of the film roll becomes too large. The thickness of the core tube is preferably from about 3 to about 20 mm.

The thus obtained roll of a polyvinyl alcohol film has an excellent appearance and is suitable for use in the preparation of polarizing films. A process for preparing polarizing films from the thus obtained polyvinyl alcohol film will be explained below.

As a process for preparing polarizing films are applicable known processes, e.g., a process wherein the obtained polyvinyl alcohol film is stretched (oriented) and is then dyed by immersing the film in a solution of iodine or a dichromatic dye, followed by treatment with a boron compound; a process wherein the stretching and the dyeing are simultaneously conducted and is then treated with a boron compound; a process wherein the film is dyed with iodine or a dichromatic dye and is stretched, and is then treated with a boron compound; and a process wherein after dyeing the film, the dyed film is stretched in a solution of a boron compound. The process for preparing polarizing films from the polyvinyl alcohol film of the present invention can be suitably selected from these processes.

The thickness of the polyvinyl alcohol film used in the preparation of polarizing films is preferably from 20 to 100 µm, more preferably from 30 to 90 µm. If the film thickness is less than 20 µm, stretching is difficult, and if the film thickness is more than 100 µm, the accuracy in film thickness lowers.

The polyvinyl alcohol film (non-stretched film) is subjected to stretching, dyeing and boron compound treatment, as mentioned above. The stretching, dyeing and boron compound treatment may be conducted in separate steps or simultaneously. In the present invention, it is preferable to conduct a uniaxial stretching (uniaxial orientation) during performing either or both of the dyeing step and the boron compound treating step.

It is preferable to uniaxially stretch the film 3 to 10 times, especially 3.5 to 6 times. At the time of the uniaxial stretching, the film may also be stretched in the perpendicular direction to the uniaxial stretching in a slight amount (to the extent of preventing a shrinkage in the cross direction or more). The stretching temperature is preferably from 40 to 170° C. It is sufficient to finally achieve the above-mentioned stretching ratio and, therefore, the stretching operation may be carried out in a single stage or may be carried out in arbitrary stages in the preparation steps.

The dyeing of the polyvinyl alcohol film is carried out by bringing a liquid containing iodine or a dichromatic dye into contact with the film. Usually, an aqueous solution of iodine-potassium iodide is used. It is preferable that the concentration of iodine is from 0.1 to 2 g/liter, the concentration of potassium iodide is from 10 to 50 g/liter, and the mixing ratio of iodine/potassium iodide is from 20 to 100 by weight. It is practical that the dyeing time is about 30 to about 500 seconds, and it is preferable that the temperature of dyeing bath is from 5 to 50° C. Water is used as a solvent, but the solvent may contain a small amount of an organic solvent miscible with water. Any of known means such as dipping, coating and spraying are applicable for bringing the dye solution into contact with the film.

The dyed polyvinyl alcohol film may be then treated with a boron compound. It is practical to use boric acid or borax as a boron compound. The boron compound is used in the form of a solution in water or a mixed solvent of water and an organic solvent and in a concentration of about 0.5 to about 2 moles/liter. From a practical point of view, it is preferable to incorporate a small amount of potassium iodide in the solution. The treatment with a boron compound is preferably carried out by a dipping method, but the coating method and the spraying method are of course applicable. The treatment is carried out at a temperature of about 50 to about 70° C. for about 5 to about 20 minutes. The stretching operation may be conducted during the boron compound treatment, if desired.

The thus obtained polarizing film can be provided on its either or both surfaces with an optically isotropic polymer film or sheet as a protective film by lamination. Examples of the protective film are, for instance, films or sheets of cellulose triacetate, cellulose diacetate, polycarbonate, polymethyl methacrylate, polystyrene, polyethersulfone, polyarylate, poly-4-methylpentene, polyphenylene oxide and the like.

For the purpose of making the polarizing film thin, a curable polymer such as urethane resin, acrylic resin or urea resin can be coated on either or both surfaces of the polarizing film to form a protective layer instead of laminating the protective film.

The polarizing film (or the polarizing film provided with a protective film or a coating layer on at least one surface thereof may be further provided on its one surface with a transparent pressure-sensitive adhesive layer by a usual method. Pressure-sensitive adhesives comprising as a main component a copolymer of an acrylic ester such as butyl acrylate, ethyl acrylate, methyl acrylate or 2-ethylhexyl acrylate, an α-monoolefinic carboxylic acid such as acrylic acid, maleic acid, itaconic acid, methacrylic acid or crotonic acid, and optionally a vinyl monomer such as acrylonitrile, vinyl acetate or styrene are particularly preferred since the polarizing property of the polarizing film is not impaired. However, the pressure-sensitive adhesives are not limited thereto, and any of known transparent pressure-sensitive adhesives can be used in the present invention, e.g., polyvinyl ether-based adhesives and rubber-based adhesives.

The thus prepared polarizing films are used, for example, in liquid crystal display devices for digital desk calculator, digital watch, word processor, personal computer, pocket information terminals and gages of automobiles and machines, sunglasses, safety goggles, stereo glasses, reflection-reducing layer for display such as CRT or LCD, medical equipment, building materials, toy, and the like.

The present invention is more specifically explained and described by means of the following Examples and Comparative Examples, wherein all % are by weight unless otherwise noted.

EXAMPLE 1

An aqueous solution of polyvinyl alcohol resin having a solid concentration of 45% (including plasticizer and releasing agent as solid matters) was prepared using a polyvinyl alcohol resin having an average degree of polymerization of 1,700 and a degree of hydrolysis of 99.7% by mole, glycerol as a plasticizer and polyoxyethylene alkylamine as a surfactant (releasing agent). The solution was cast from a T-die onto a dram roll in the form of a thin film and dried, followed by heat-treatment and humidity-conditioning, to give a polyvinyl alcohol film having a water content of 4%.

The polyvinyl alcohol film was subsequently wound up around an aluminum cylindrical core tube having the following properties under the following conditions.

Aluminum Cylindrical Core Tube

Diameter (outer diameter): 165 mm

Length of cylinder: 2.7 m

Roundness: 0.07 mm

Cylindricality: 0.05 mm

Surface roughness: 35 S

Winding Conditions

Contact pressure of guide roll (touch roll) with core tube: 150 N/m

Winding tension: 130 N/m

Winding speed: 80 m/minute

The roll of the polyvinyl alcohol film was then unwound at a rate of 1.23 m/minute. After swelling the film in a water bath for washing at 24° C., the film was uniaxially stretched 1.8 times in an iodine bath (20° C., iodine 0.17 g/liter) and 1.7 times in a boric acid bath (50° C., iodine 12 ppm, boric acid 47 g/liter), and further uniaxially stretched 4.6 times in total at a winding speed of 5.6 m/minute to give a polarizing film.

EXAMPLE 2

A polyvinyl alcohol film having a water content of 4% was prepared in the same manner as in Example 1.

The polyvinyl alcohol film was subsequently wound up around an aluminum cylindrical core tube having the following properties under the same conditions as in Example 1.

Aluminum Cylindrical Core Tube

Diameter (outer diameter): 165 mm

Length of cylinder: 2.9 m

Roundness: 0.10 mm

Cylindricality: 0.09 mm

Surface roughness: 30 S

The roll of the polyvinyl alcohol film was unwound, treated and uniaxially stretched 4.6 times in total in the same manner as in Example 1 to give a polarizing film.

EXAMPLE 3

A polyvinyl alcohol film having a water content of 4% was prepared in the same manner as in Example 1.

The polyvinyl alcohol film was subsequently wound up around an aluminum cylindrical core tube having the following properties under the same conditions as in Example 1.

Aluminum Cylindrical Core Tube
Diameter (outer diameter): 114 mm
Length of cylinder: 2.2 m
Roundness: 0.05 mm
Cylindricality: 0.08 mm
Surface roughness: 35 S The roll of the polyvinyl alcohol film was unwound, treated and uniaxially stretched 4.6 times in total in the same manner as in Example 1 to give a polarizing film.

EXAMPLE 4

A polyvinyl alcohol film having a water content of 4% was prepared in the same manner as in Example 1.

The polyvinyl alcohol film was subsequently wound up around an aluminum cylindrical core tube having the following properties under the same conditions as in Example 1.

Aluminum Cylindrical Core Tube
Diameter (outer diameter): 165 mm
Length of cylinder: 3.3 m
Roundness: 0.1 mm
Cylindricality: 0.09 mm
Surface roughness: 35 S The roll of the polyvinyl alcohol film was unwound, treated and uniaxially stretched 4.6 times in total in the same manner as in Example 1 to give a polarizing film.

COMPARATIVE EXAMPLE 1

A polyvinyl alcohol film having a water content of 4% was prepared in the same manner as in Example 1.

The polyvinyl alcohol film was subsequently wound up around a cylindrical core tube having the following properties made of a plastic (polyvinyl chloride) under the following conditions.

Plastic Cylindrical Core Tube
Diameter (outer diameter): 165 mm
Length of cylinder: 2.7 m
Roundness: 0.8 mm
Cylindricality: 1.2 mm
Surface roughness: 40 S Winding Conditions
Contact pressure of guide roll (touch roll) with core tube: 150 N/m
Winding tension: 130 N/m
Winding speed: 80 m/minute The roll of the polyvinyl alcohol film was unwound, treated and uniaxially stretched 4.6 times in total in the same manner as in Example 1 to give a polarizing film. The film roll could not be stably unwound due to wrinkles formed when winding the film, so uniform stretching could not be achieved.

COMPARATIVE EXAMPLE 2

A polyvinyl alcohol film having a water content of 4% was prepared in the same manner as in Example 1.

The polyvinyl alcohol film was subsequently wound up around a cylindrical core tube having the following properties made of a paper under the following conditions.

Paper Cylindrical Core Tube
Diameter (outer diameter): 153 mm
Length of cylinder: 1.6 m
Roundness: 1.2 mm
Cylindricality: 1.5 mm
Surface roughness: 40 S Winding Conditions
Contact pressure of guide roll (touch roll) with core tube: 150 N/m
Winding tension: 130 N/m
Winding speed: 80 m/minute The roll of the polyvinyl alcohol film was unwound, treated and uniaxially stretched 4.6 times in total in the same manner as in Example 1 to give a polarizing film. The film roll could not be stably unwound due to wrinkles formed when winding the film, so uniform stretching could not be achieved.

COMPARATIVE EXAMPLE 3

A polyvinyl alcohol film having a water content of 4% was prepared in the same manner as in Example 1.

The polyvinyl alcohol film was subsequently wound up around an aluminum cylindrical core tube having the following properties under the following conditions.

Aluminum Cylindrical Core Tube
Diameter (outer diameter): 165 mm
Length of cylinder: 2.7 m
Roundness: 1.1 mm
Cylindricality: 1.3 mm
Surface roughness: 120 S Winding Conditions
Contact pressure of guide roll (touch roll) with core tube: 150 N/m
Winding tension: 130 N/m
Winding speed: 80 m/minute The roll of the polyvinyl alcohol film was unwound, treated and uniaxially stretched 4.6 times in total in the same manner as in Example 1 to give a polarizing film. However, breaking of the film frequently occurred when stretching the film since the edge portions of the film were folded to cause blocking, so no polarizing film was obtained.

The polyvinyl alcohol films and polarizing films obtained in the Examples and Comparative examples were evaluated according to the following methods. The results are shown in Table 1.

Presence of Wrinkles

The polyvinyl alcohol films wound up 1,000 m was visually observed with respect to presence of wrinkles and evaluated according to the following criteria.
○: Formation of wrinkles is not observed.
X: Formation of wrinkles is observed.

Uneven Dyeing

The polarizing films were visually observed with respect to uneven dyeing and evaluated according to the following criteria.
○: Uneven dyeing is not observed.
X: Uneven dyeing is observed.

Polarizing Properties

The simplex percent transmission and degree of polarization of the polarizing films were measured by a spectrocolorimeter (model Σ90 made by Nippon Denshoku Kogyo Kabushiki Kaisha) at five positions in the transverse direction and the respective average values were obtained.

TABLE 1

|  | Ex. 1 | Ex. 2 | Ex. 3 | Ex. 4 | Com. Ex. 1 | Com. Ex. 2 | Com. Ex. 3 |
|---|---|---|---|---|---|---|---|
| Cylindrical core tube | | | | | | | |
| Material | Al | Al | Al | Al | plastic | paper | Al |
| Diameter (mm) | 165 | 165 | 114 | 165 | 165 | 153 | 165 |
| Length (m) | 2.7 | 2.9 | 2.2 | 3.3 | 2.7 | 1.6 | 2.7 |
| Roundness (mm) | 0.07 | 0.1 | 0.05 | 0.1 | 0.8 | 1.2 | 1.1 |
| Cylindricality (mm) | 0.05 | 0.09 | 0.08 | 0.09 | 1.2 | 1.5 | 1.3 |
| Surface roughness | 35 S | 30 S | 35 S | 35 S | 40 S | 40 S | 120 S |
| Polyvinyl alcohol film | | | | | | | |
| Presence or absence of wrinkles | ◯ | ◯ | ◯ | ◯ | X | X | X |
| Uneven dyeing | ◯ | ◯ | ◯ | ◯ | X | X | X |
| Polarizing property | | | | | | | |
| Transmission (%) | 42.7 | 42.8 | 42.7 | 42.9 | 42.6 | 42.4 | —* |
| Degree of polarization (%) | 99 | 99.2 | 99.1 | 99.1 | 97.6 | 96.8 | —* |

*No polarizing film was obtained due to breaking of film.

As shown in Table 1, the polyvinyl alcohol film rolls obtained in the examples were good in winding state and had no wrinkle, so polarizing films free of uneven dyeing and having excellent optical properties were obtained therefrom.

In contrast, the polyvinyl alcohol film rolls obtained in the comparative examples had wrinkles, so unwinding was not stabilized and uniform stretching was not achieved. Thus, uneven dyeing occurred and the obtained polarizing films had lower optical properties. In particular, in Comparative Example 3, breaking of the film frequently occurred at the time of stretching the film, so a polarizing film was not obtained.

As explained above, in the present invention, a polyvinyl alcohol film formed from a solution of a polyvinyl alcohol resin is wound up around a cylindrical core tube made of a metallic material and having a surface roughness of at most 100 S. As a result, no wrinkle is formed in the wound film, so the appearance is good and a polyvinyl alcohol film which is homogeneous as a whole can be obtained.

Therefore, a polarizing film prepared from such a polyvinyl alcohol film roll has an excellent polarizing property, since uneven stretching and uneven dyeing do not occur in the dyeing and stretching steps in the production of polarizing films.

If the cylindrical core tube further has a roundness of 0.01 to 1 mm and a cylindricality of 0.01 to 1 mm, the fluctuation of the core tube in winding is diminished and, therefore, a better winding state is obtained.

It is preferable that the cylindrical core tube has an outer diameter of 75 to 210 mm and a length of 0.5 to 4.0 m, since the handling is easy and, therefore, the workability and productivity are good.

What is claimed is:

1. A roll of a polyvinyl alcohol film obtained by winding up the polyvinyl alcohol film around a cylindrical core tube after forming the film from a solution of a polyvinyl alcohol resin, wherein the cylindrical core tube is made of a metallic material and has a surface roughness (Ra) of at most 100 µm, a roundness of 0.01 to 0.2 mm and a cylindricality of 0.01 to 1 mm, and wherein a thickness of said polyvinyl alcohol film is 20 to 100 µm.

2. The roll of claim 1, wherein said cylindrical core tube has an outer diameter of 75 to 210 mm and a length of 0.5 to 4.0 m.

* * * * *